United States Patent [19]
Lugert

[11] Patent Number: 6,056,810
[45] Date of Patent: May 2, 2000

[54] COLORED LEAD PENCIL

[75] Inventor: Gerhard Lugert, Nürnberg, Germany

[73] Assignee: A. W. Faber-Castell, Stein, Germany

[21] Appl. No.: 09/215,145

[22] Filed: Dec. 18, 1998

[30] Foreign Application Priority Data

Dec. 18, 1997 [DE] Germany .............................. 197 56 401

[51] Int. Cl.⁷ .................................................. C09D 13/00
[52] U.S. Cl. ....................................... 106/31.09; 106/31.11
[58] Field of Search ............................... 106/31.09, 31.11, 106/31.32

[56] References Cited

U.S. PATENT DOCUMENTS

| | | | |
|---|---|---|---|
| 3,627,546 | 12/1971 | Coppeta et al. ........................... | 106/19 |
| 3,957,495 | 5/1976 | Teranishi et al. .......................... | 106/19 |
| 4,441,928 | 4/1984 | Iijima ................................... | 106/31.32 |
| 5,464,470 | 11/1995 | Brachman et al. ................... | 106/31.08 |
| 5,503,665 | 4/1996 | Miller et al. ......................... | 106/31.16 |
| 5,534,587 | 7/1996 | Smith ................................... | 106/31.25 |

FOREIGN PATENT DOCUMENTS

| | | | |
|---|---|---|---|
| 0 017 889 A1 | 4/1980 | European Pat. Off. . | |
| 0 017 889 A1 | 10/1980 | European Pat. Off. ........ | C09D 11/16 |
| PS 937907 | 1/1956 | Germany . | |
| 29 45 428 C1 | 3/1979 | Germany . | |
| 31 26 983 A1 | 7/1981 | Germany . | |

OTHER PUBLICATIONS

Derwent No. 93–022234/03 of JP 04348998–A, Jan. 18, 1991.

Derwent No. 80–A9458C/05, Dec. 1979.

Derwent No. 93–169729/21 of JP 05099927–A, Oct. 9, 1991.

*Primary Examiner*—Mark L. Bell
*Assistant Examiner*—Veronica F. Faison
*Attorney, Agent, or Firm*—Venable; Gabor J. Kelemen; Ashley J. Wells

[57] ABSTRACT

The invention relates to a colored pencil lead having an essentially water-free base material that is at least partially water-soluble or can be suspended in water, which base material contains at least one dye and at least one reactant present in a solid form, wherein this reactant, when in a watery solution, causes a change in color in the dye.

20 Claims, No Drawings

COLORED LEAD PENCIL

CROSS-REFERENCE TO RELATED APPLICATION

The present disclosure relates to the subject matter disclosed in German Application No. 197 56 401.1-43 filed Dec. 18, 1997, the entire specification of which is incorporated herein by reference.

BACKGROUND OF THE INVENTION

Field of the Invention

The invention relates to a colored pencil lead or a crayon composed of a base material that is at least partially water-soluble or that can be suspended in water, and a coloring agent, e.g., a water-soluble dye. Any reference herein to a colored pencil lead is also understood to mean a crayon unless otherwise stated. The downstrokes produced with such a lead can be applied as water colors to the surface of a suitable substrate, e.g., a sheet of paper or canvas, which is water receptive. That is to say, the lead can be wetted with water and applied to the surface as a suspension or a solution, or the lead can be applied to the surface as a downstroke coating and painted over with water to provide a suspension or solution which soaks into the substrate. The water color painted substrate is then dried in any manner.

It is an object of the invention to provide a colored pencil lead or a crayon which makes it possible to achieve a broader range in color variation than available in the prior art.

SUMMARY OF THE INVENTION

This and other objects are achieved by providing a colored article which is one of a pencil lead or a crayon, comprising a composition comprised of a base material which is essentially water-free and which is one of (a) at least partially water-soluble or (b) suspendable in water; at least one dye which is distributed in the base material; and at least one reactant which is distributed in the base material, which is present in solid form, and which, when dissolved in water, causes a color change in the dye.

A premature reaction causing a color change is prevented in the article owing to the fact that the reactant at least is present in a solid form in the essentially water-free base material. Only when the lead is downstroked as a water color downstroke, i.e., the lead is wetted before application or the lead is applied then painted over with water, with enough water mixed into the base material to dissolved an amount of the reactant which is effective to react with the dye material and to thereby cause a change in the color of the dye material.

In addition to changeable dyes, coloring agents that are not and/or cannot be influenced by the reactant can also be incorporated into the base material for the lead to achieve specific color nuances or color mixtures.

The change in color upon wetting can be effected in various ways.

In a first preferred embodiment for a color changing lead or crayon, the composition includes an acid-base indicator as the changeable or color-changing dye. This acid-base indicator forms a protolytic system with the reactant in a watery solution. A dye such as methyl red (C.I. 13020) or its water-soluble Na salt is used, for example, as coloring agent and an acid, e.g., citric acid, is used as the reactant. For water-color painting, the acid dissolves in the water added to the lead before or after downstroking onto a surface and changes the pH value to the acidic range thereby causing the originally yellow color of the lead to change to red.

In this embodiment, the at least one dye is advantageously a color indicator and is an acid-base indicator, and the at least one reactant is advantageously one of (a) an acid or (b) a base. The at least one color indicator is advantageously selected from the group consisting of FD&C green 3 (C.I. 42053), phenolphthalein (CAS 77-09-8), thymol blue (CAS 76-61-9), thymolphthalein (CAS 125-20-2), bromcresol purple (CAS 115-40-2), sodium salt of the 3-oxypyrene trisulphonic acid (C.I. 59040), neutral red (C.I. 50040), methyl red (C.I. 13020), alizarin red S (C.I. 58005), and fluorescin (C.I. 45350). The at least one reactant is advantageously at least one acid selected from the group consisting of alkali hydrogen sulfate, alkali hydrogen phosphate, succinic acid, tartaric acid and citric acid. Alternatively, the at least one reactant is advantageously at least one base selected from the group consisting of alkali carbonates, alkali phosphates and alkali acetates.

A second preferred embodiment for a color changing lead or crayon provides a composition which combines redox indicators with reactants which are reducing agents or oxidizing agents. The at least one redox indicator is advantageously selected from the group consisting of indigocarmine (C.I. 73015), methylene blue (C.I. 52015), neutral red (C.I. 50040), amido black 10B (C.I. 20470), acid blue 93:1(C.I. 42780:1), and acid blue 93 (C.I. 42780). Preferably the at least one reactant is a reducing agent and is sodium dithionite.

In this second preferred embodiment, it is possible to effect a diminution or deleting of the color, or a more or less strong color change, by varying the concentration of the reactant. The invention includes a lead whose color is the result of mixing several dyes, wherein one of the dyes is, for example, a redox indicator which can be decolorized completely by the reactant. The application of water thus will result in a coloring that corresponds to the mixture of the changed and/or unchanged dyes. The invention also includes a lead having, in addition to the corresponding reactants, an acid-base indicator that is simultaneously a redox indicator.

In addition to the aforementioned dye and reactant combinations, the invention contempletes combinations where the reactant contains a bathochromic group which becomes attached to a dye in a watery solution and effects a color change or color displacement. Furthermore, complexing agents can be used as dyes and salts can be used as reactants so that a colored complex is formed between the complexing agent and metal ions of the salt.

The base material advantageously comprises fats and/or waxes, and emulsifying agents which are at least partially water-soluble. An example of a useful fat is stearic acid. An example of a useful wax is paraffin. Exemplary emulsifying agents include fatty alcohol polyglycolether, a mixture of fatty glycolesters with stearic polyglycolesters, e.g., CAS 9004-99-1, and stearic monoethanolamide, e.g., CAS 111-57-9. These and other fats, waxes and emilsifying agents for colored lead pencils and crayons are well known in the art.

The object of the present invention is additionaly achieved by providing a method of obtaining a broad range of color variation in a water color painted surface, the method comprising (a) providing a colored article as described above and (b) watercolor painting a substrate which is water receptive by one of (i.) wetting the article with water followed by downstroking the article onto the substrate to provide a colored coating thereon, or (i.i.)

downstroking the article onto the substrate to provide a coating thereon followed by painting over at least the coating with water. In this method, the composition advantageously further comprises an additional coloring agent having a color which is not changed by the at least one reactant.

DESCRIPTION OF THE PREFERRED EMBODIMENTS

The invention is explained in further detail in the following with the aid of several exemplary embodiments.

EXAMPLE 1

The following constituents for a colored pencil lead composition were mixed in a standard way with a kneader, without adding water, and were extruded into leads:

25 weight % polyethylene glycol (relative molar mass 6000),
22 weight % kaolin,
15 weight % talcum,
12 weight % stearic acid,
10 weight % sodium stearate,
6 weight % FD&C green 3 (C.I. 42053),
5 weight % sodium carbonate, and
5 weight % CAS No. 9004-99-3.

The lead composition constituent CAS No. 9004-99-3 is a waxy, water-soluble mixture of fatty acid polyglycol esters with stearic acid polyglycol ester as the primary component.

When downstroked on paper, leads having the above composition provide a coating having a green color on the paper which, when painted over with water, turns to a violet color.

EXAMPLE 2

A composition for a colored pencil lead or crayon was produced in accordance with Example 1 and was composed of the following constituents which include an indicator which shows a change in color for the acidic pH range:

25 weight % polyethylene glycol (relative molar mass 6000),
12 weight % stearic acid,
5 weight % CAS No. 9004-99-3,
25 weight % kaolin,
15 weight % talcum,
10 weight % sodium stearate,
6 weight % methyl red, and
2 weight % citric acid.

When downstroked on paper, leads or crayons having the above composition provide a coating having a yellow color on the paper which, when painted over with water, turns to a red color as the acid dissolves and changes the pH value of the composition to the acidic range.

EXAMPLE 3

The following composition is particularly suitable for a crayon having, for example, a diameter of 10 mm, and was produced in accordance with Example 1:

50 weight % alcohol polyglycol ether,
38 weight % kaolin,
9 weight % acid blue 93 (C.I. 42780), and
2 weight % sodium dithionite, and
1 weight % pigment yellow 74 (C.I. 11741).

When downstroked on paper, crayons having the above composition provide a coating having a blue-green color on the paper which, when painted over with water, changes to a light yellow color. The color change occurs because the acid blue 93 dye is decolored by the reactant, whereas the pigment yellow 74 dye remains unchanged. Small traces of a substance having an alkaline effect, e.g., sodium carbonate, are favorably added to compositions of this type.

EXAMPLE 4

A composition for a colored pencil lead or crayon was produced in accordance with Example 1 and was composed of the following constituents:

30 weight % kaolin,
10 weight % stearic acid,
10 weight % titanium dioxide,
10 weight % phenolphthalein,
6 weight % sodium stearate,
32 weight % fatty alcohol polyglycol ether, and
2 weight % sodium carbonate.

When downstroked on paper, leads having the above composition provide a coating having a white color on the paper which, when painted over with water, turns to a pink color.

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A colored article which is one of a pencil lead or a crayon, comprising a composition comprised of:
   a base material which is essentially water-free and which is one of (a) at least partially water-soluble or (b) suspendable in water;
   at least one dye which is distributed in the base material; and
   at least one reactant which is distributed in the base material, which is present in solid form, and which, when dissolved in water, causes a color change in the dye.

2. The colored article according to claim 1, wherein the at least one dye is a color indicator and is an acid-base indicator, and wherein the at least one reactant is one of (a) an acid or (b) a base.

3. The colored article according to claim 2, wherein at least one color indicator is selected from the group consisting of FD&C green 3 (C.I. 42053), phenolphthalein (CAS 77-09-8), thymol blue (CAS 76-61-9), thymolphthalein (CAS 125-20-2), bromcresol purple (CAS 115-40-2), sodium salt of the 3-oxypyrene trisulphonic acid (C.I. 59040), neutral red (C.I. 50040), methyl red (C.I. 13020), alizarin red S (C.I. 58005), and fluorescin (C.I. 45350).

4. The colored article according to claim 3, wherein the at least one reactant is at least one acid selected from the group consisting of alkali hydrogen sulfate, alkali hydrogen phosphate, succinic acid, tartaric acid and citric acid.

5. The colored article according to claim 4, wherein the composition further comprises an additional coloring agent having a color which is not changed by the at least one reactant.

6. The colored article according to claim 3, wherein the at least one reactant is at least one base selected from the group consisting of alkali carbonates, alkali phosphates and alkali acetates.

7. The colored article according to claim 6, wherein the composition further comprises an additional coloring agent having a color which is not changed by the at least one reactant.

8. The colored article according to claim 2, wherein the at least one reactant is at least one acid selected from the group consisting of alkali hydrogen sulfate, alkali hydrogen phosphate, succinic acid, tartaric acid and citric acid.

9. The colored article according to claim 8, wherein the composition further comprises an additional coloring agent having a color which is not changed by the at least one reactant.

10. The colored article according to claim 2, wherein the at least one reactant is at least one base selected from the group consisting of alkali carbonates, alkali phosphates and alkali acetates.

11. The colored article according to claim 10, wherein the composition further comprises an additional coloring agent having a color which is not changed by the at least one reactant.

12. The colored article according to claim 1, wherein the at least one dye is at least one redox indicator, and wherein the at least one reactant is an agent selected from the group consisting of a reduction agent or an oxidation agent.

13. The colored article according to claim 12, wherein the at least one redox indicator is selected from the group consisting of indigocarmine (C.I. 73015), methylene blue (C.I. 52015), neutral red (C.I. 50040), amido black 10B (C.I. 20470), acid blue 93:1 (C.I. 42780:1), and acid blue 93 (C.I. 42780).

14. The colored article according to claim 13, wherein the composition further comprises an additional coloring agent having a color which is not changed by the at least one reactant.

15. The colored article according to claim 12, wherein the at least one reactant is a reducing agent and is sodium dithionite.

16. The colored article according to claim 15, wherein the composition further comprises an additional coloring agent having a color which is not changed by the at least one reactant.

17. The colored article according to claim 1, wherein the composition further comprises an additional coloring agent having a color which is not changed by the at least one reactant.

18. The colored article according to claim 1, wherein base material comprises wax containing emulsifiers which are at least partially water-soluble.

19. A method of obtaining a broad range of color variation in a water color painted surface, the method comprising:
   a. providing a colored article which is one of a pencil lead or a crayon, comprised of a composition comprising:
      a base material which is essentially water-free and which is one of (a) at least partially water-soluble or (b) suspendable in water;
      at least one dye which is distributed in the base material; and
      at least one reactant which is distributed in the base material, which is present in solid form, and which, when dissolved in water, causes a color change in the dye; and
   b. watercolor painting a substrate which is water receptive by one of:
      i. wetting the article with water followed by downstroking the article onto the substrate to provide a colored coating thereon, or
      i.i. downstroking the article onto the substrate to provide a coating thereon followed by painting over the substrate with water.

20. The method according to claim 19, wherein the composition further comprises an additional coloring agent having a color which is not changed by the at least one reactant.

* * * * *

UNITED STATES PATENT AND TRADEMARK OFFICE
CERTIFICATE OF CORRECTION

PATENT NO : 6,056,810
DATED : May 2, 2000
INVENTOR(S): Gerhard LUGERT

It is certified that error appears in the above-identified patent and that said Letters Patent is hereby corrected as shown below:

On the title page, item [73], please delete "A.W. Faber-Castell" and insert therefore --A.W. Faber-Castell Unternehmensverwaltung GmbH & Co--.

Signed and Sealed this

Twenty-fifth Day of July, 2000

Attest:

Q. TODD DICKINSON

*Attesting Officer*

*Director of Patents and Trademarks*